United States Patent [19]

Leidy

[11] Patent Number: 4,489,795

[45] Date of Patent: Dec. 25, 1984

[54] SHOCK RESISTANT DIGGING IRON

[76] Inventor: Richard F. Leidy, 4910 Arters Mill Rd., Westminster, Md. 21157

[21] Appl. No.: 379,093

[22] Filed: May 17, 1982

[51] Int. Cl.³ .............................................. B25G 1/12
[52] U.S. Cl. ...................................... 175/320; 294/57; 16/116 R; 174/138 R
[58] Field of Search .................... 175/320; 294/57, 49; 254/131, 131.5, 132; 299/91-93, 94; 173/162 H; 138/DIG. 2; 174/46, 5 R, 138 R, 138 D; 16/116 R

[56] References Cited

U.S. PATENT DOCUMENTS

| 138,599 | 5/1873 | Wright et al. | 299/94 |
| 436,157 | 9/1890 | Slocom | 254/25 |
| 875,159 | 12/1907 | Crow | 294/57 |
| 1,248,445 | 12/1917 | Braine | 294/57 |
| 1,291,505 | 1/1919 | Hecox | 294/57 |
| 2,457,258 | 12/1948 | Mitchell | 254/21 |
| 2,553,327 | 5/1951 | Norman | 254/120 |
| 2,732,423 | 1/1956 | Morrison | 174/209 |
| 2,997,529 | 8/1961 | Fink | 174/5 R |
| 3,328,223 | 6/1967 | Fink | 174/138 R |
| 3,619,009 | 11/1971 | O'Leary | 294/57 |
| 3,688,017 | 8/1972 | Roots | 174/46 |
| 3,712,659 | 1/1973 | Kneissl | 294/57 |
| 3,915,782 | 10/1975 | Davis et al. | 16/116 R |

FOREIGN PATENT DOCUMENTS

| 636428 | 2/1962 | Canada | 16/116 R |
| 567568 | 10/1957 | Italy | 175/320 |
| 909297 | 10/1962 | United Kingdom | 294/57 |

Primary Examiner—James A. Leppink
Assistant Examiner—Hoang C. Dang
Attorney, Agent, or Firm—John F. McClellan, Sr.

[57] ABSTRACT

An improved digging iron for probing for buried high tension lines has for safety an insulative, non-wettable shaft of glaze-finish fibreglass which may additionally have a silicone rubber dielectric coating on it. The shaft has shouldered ends fitting sockets of the chisel shaped digging end and of a circular-section top section with the shoulders abutting the sockets and the ends bottoming in the sockets for support; the top section acts to reinforce the shaft for driving or as an integral hammer mass and serves as a balance for the digging end.

1 Claim, 4 Drawing Figures

SHOCK RESISTANT DIGGING IRON

FIELD OF THE INVENTION

This invention relates generally to hand tools and specifically to an improvement in the types of hand tools known as digging irons.

BACKGROUND OF THE INVENTION

Although hand tools have yielded many functions to machine tools, hand tools remain indispensable in dozens of skilled occupations, the building trades being an example.

An important function of the hand tools known as digging irons is to dig over buried live power lines which would be shorted-out or broken by powered digging implements, and which can be hazardous to workmen in the area.

Sometimes the location and depth of underground power lines may be known exactly, sometimes within a few feet, and sometimes the presence of power lines may be only suspected. Today with all the underground utility lines and more going in daily, it is almost impossible to dig safely.

Voltages commonly encountered in underground power lines range from 220 volts to 7200 volts.

In the prior art digging irons have to, at least some extent, been conductive, either having large metallic structure or else wettable structures with reduced dielectric constant when wet.

Many shock and burn injuries, sometimes fatal, have happened to workmen who encountered undergound power lines while exploring with ordinary digging irons.

The following U.S. patents are representative of known prior art:

No. 2,553,327 issued to W. A. Norman on May 15, 1951, discloses a device which might be used as a digging bar in that it has a metal chisel shaped blade at the bottom, and which has a handle 10 made of wood and set into a metal tubular socket at the bottom end of the handle. The handle ends in an enlarged portion at the top.

No. 2,457,258 issued to G. P. Mitchell on Dec. 28, 1948 for an insulation puller has a "handle 1 preferably of wood or any other insulation material" but has no digging tip;

No. 436,157 issued to C. H. Slocom on Sept. 9, 1890 discloses a tack puller with metal tool portion at bottom and a tack hammer head at the top, presumably of metal also.

OBJECTS OF THE INVENTION

Primary objects of this invention therefore are to provide a digging tool which is a safeguard against injury through electrical shock and burns from high voltage cables undergound while remaining efficient in forcing into the earth and prying the earth aside.

Further objects are to provide a tool as described which is a composite of metallic material and non-wettable dielectric material strongly affixed in assembly but any part of which is easily replaceable if damaged.

Still further objects are to provide a tool as described which is relatively lightweight and balanced and handy when in intended use digging or probing for live wires, and which can be made in light and heavy embodiments as desired, depending on weight of top and bottom sections employed.

BRIEF DESCRIPTION OF THE DRAWING FIGURES

The above and other objects and advantages of this invention will become more readily apparent on examination of of the following description, including the drawings in which like reference numerals refer to like parts.

DETAILED DESCRIPTION

Figure 1:
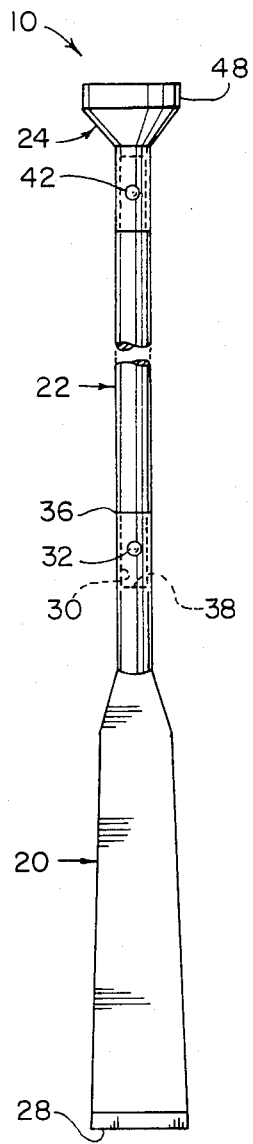
FIG. 1 is a face perspective view of a tool according to this invention.
Figure 2:
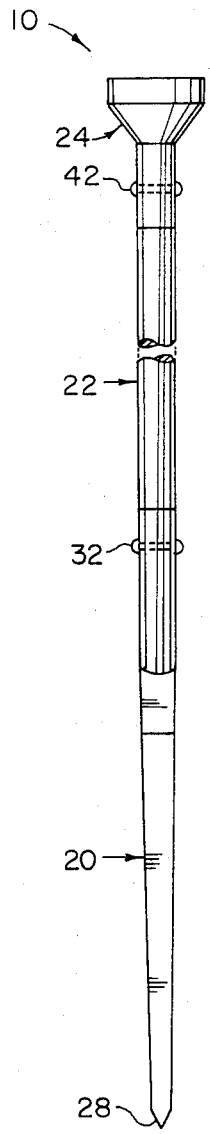
FIG. 2 is a side perspective view thereof.
Figure 3:
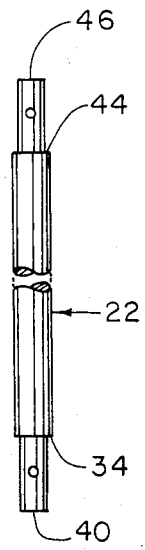
FIG. 3 is a handle detail.
Figure 4:
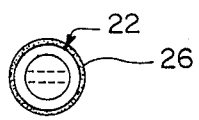
FIG. 4 is an end view of the shaft, on an enlarged scale.

FIGS. 1, 2 and 3 show the invention 10 as including a bottom section 20, a shaft 22, and a top section 24. The shaft is an insulative solid rod of solid fibreglass, with a smooth glazed type unwettable finish, preferably covered by a water-shedding dielectric layer of silicone rubber, indicated at 26, FIG. 4.

The bottom section 20 may be of steel and has a digging edge 28 transverse to the tool length.

From the digging edge the tool narrows in width but widens in thickness, to an axial socket 30 opposite the digging edge.

This axial socket 30 may hold and reinforce the shaft, which it fits, against downward digging forces in three ways: (1) by means of a rivet 32 transversely through the socket about halfway along the socket length; (2) by means of shoulder 34 on the shaft 22 which rests against the transverse upper end 36 of the socket 30; and (3) by means of transverse socketbottom 38 which may receive against it the transverse lower end 40 of the shaft.

The upper end of the shaft 22 is similarly received and supported by the top section 24 against driving forces, rivet 42 securing the assembly and shoulder 44 and end 46 of the shaft bearing against the end and bottom of the socket.

The top section or member 24 may have above the socket an integral circular cap 48 or mass for symmetrically balancing and helping drive the bottom section into the ground in probing for underground utility lines. It is preferably 2.5 inches (6.3 cm) in diameter and may balance the lower section. For safety in handling the cylindrical portion fairs into the socket in a conical shape.

The shaft is preferably 1 inch (2.5 cm) in diameter, and four feet (12 m) long between shoulders, with 4 inch (10 cm) long, reduced-section ends of ¾ inch (1.8 cm) diameter.

The lower section is preferably 17 inches (42.5 cm) long by 2.4 (6.3 cm) wide along the digging edge. Overall length is preferably 6 feet (1.8 m).

Thus dielectric spacing between conductive ends is four feet and may be 3 to 4 feet (0.9 to 1.3 m) below the handgrip of the user at all times. Fibreglass rods have been proven as durable, strong insulators in high-line guy service. The circular cap may be used for tamping by reversing the tool. The shaft will never be hot or cold to the touch in the sense of a metal shaft, but comfortable instead and by means of the silicone rubber covering all provide a non-slip safety factor. To replace any element, bottom section, shaft or top section, it is only necessary to grind off a rivet head, disassemble, replace the desired element, and re-rivet.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a digging iron having a digging end of metal in the shape of a wedge, a shaft with an upper end and a lower end, and means connecting the digging end and the shaft; the improvement comprising: the shaft being of unwettable dielectric material, a top section of metal on said shaft; said unwettable dielectric material composed of a solid rod of solid fibreglass, said shaft having a smooth glazed finish, and means connecting comprising the shaft axially supported in first socket structure in said digging end; the shaft axially supported in second socket structure in said top section, the shaft having a respective shoulder engaging each of said first and second socket structures, a respective socket bottom supporting each end of upper and lower ends of said shaft, said top section having a portion with a substantially flat upper surface for driving, said top section substantially balancing said digging end, and said solid rod of solid fibreglass covered by a water-shedding dielectric layer.

* * * * *